(12) United States Patent
Collison

(10) Patent No.: US 11,447,962 B2
(45) Date of Patent: Sep. 20, 2022

(54) FLOOR UNDERLAYMENT THAT ALLOWS WATER FLOW THERETHROUGH IN ONLY ONE DIRECTION

(71) Applicant: MP Global Products, L.L.C., Norfolk, NE (US)

(72) Inventor: Alan B. Collison, Pierce, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 58 days.

(21) Appl. No.: 17/086,231

(22) Filed: Oct. 30, 2020

(65) Prior Publication Data
US 2021/0131123 A1    May 6, 2021

Related U.S. Application Data

(60) Provisional application No. 62/928,664, filed on Oct. 31, 2019.

(51) Int. Cl.
| | | |
|---|---|---|
| *E04F 15/18* | (2006.01) | |
| *B32B 3/26* | (2006.01) | |
| *B32B 27/12* | (2006.01) | |
| *B32B 7/12* | (2006.01) | |

(52) U.S. Cl.
CPC .............. *E04F 15/18* (2013.01); *B32B 3/266* (2013.01); *B32B 7/12* (2013.01); *B32B 27/12* (2013.01); *B32B 2250/02* (2013.01); *B32B 2307/102* (2013.01); *B32B 2307/304* (2013.01); *B32B 2307/726* (2013.01);
(Continued)

(58) Field of Classification Search
CPC ........ E04F 15/18; E04F 15/182; B32B 3/266; B32B 27/12; B32B 2370/102; B32B 2307/7246
See application file for complete search history.

(56) References Cited

U.S. PATENT DOCUMENTS

| 4,932,182 A | 6/1990 | Thomasson |
| 7,651,757 B2 | 1/2010 | Jones et al. |
| 9,528,280 B2 | 12/2016 | Cormier et al. |

(Continued)

FOREIGN PATENT DOCUMENTS

| EP | 2894276 A1 | 7/2015 |
| WO | WO-2014/006524 A2 | 1/2014 |

OTHER PUBLICATIONS

International Search Report and Written Opinion dated Feb. 14, 2022 corresponding to International Application No. PCT/US2021/056657, 13 pages.

*Primary Examiner* — Joanna Pleszczynska
(74) *Attorney, Agent, or Firm* — Harness, Dickey & Pierce, P.L.C.

(57) ABSTRACT

A floor underlayment includes a fiber pad and a vapor barrier layer. The fiber pad includes reinforcement fibers and thermoplastic binder fibers binding the reinforcement fibers together. The vapor barrier layer has a bottom surface attached to the fiber pad, a top surface opposite of the bottom surface, and a matrix of holes extending through the top and bottom surfaces thereof. The holes are configured to allow moisture to flow through the holes in a downward direction from the top surface of the vapor barrier layer to the bottom surface of the vapor barrier layer while inhibiting water flow through the holes in an upward direction opposite of the downward direction.

20 Claims, 4 Drawing Sheets

(52) U.S. Cl.
 CPC . *B32B 2307/7246* (2013.01); *B32B 2307/732* (2013.01); *B32B 2471/00* (2013.01)

(56) References Cited

U.S. PATENT DOCUMENTS

| | | |
|---|---|---|
| 2004/0197544 A1 | 10/2004 | Ramesh et al. |
| 2006/0216471 A1* | 9/2006 | Grah ................ B32B 21/10 428/137 |
| 2006/0286347 A1* | 12/2006 | Mehta ................ B32B 5/022 428/137 |
| 2011/0047907 A1 | 3/2011 | Smolka et al. |
| 2011/0154762 A1* | 6/2011 | Collison ................ B32B 5/08 52/309.1 |
| 2018/0080233 A1 | 3/2018 | Collison |
| 2019/0134941 A1* | 5/2019 | Orologio ................ B32B 15/20 |
| 2021/0131123 A1 | 5/2021 | Collison |

* cited by examiner

FLOOR UNDERLAYMENT THAT ALLOWS WATER FLOW THERETHROUGH IN ONLY ONE DIRECTION

CROSS-REFERENCE TO RELATED APPLICATIONS

This application claims the benefit of U.S. Provisional Application No. 62/928,664, filed on Oct. 31, 2019. The entire disclosure of the application referenced above is incorporated herein by reference.

FIELD

The present disclosure relates to a flooring system that uses an underlayment pad under flooring material to improve acoustic and thermal insulation properties while preventing moisture buildup between the flooring material and the underlayment pad.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Underlayment pads are widely used in flooring applications. An underlayment pad is desirable when a flooring such as wood flooring is applied over a subflooring. These pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the subflooring, and may provide a barrier against moisture (e.g., water) and dirt. Finally, pads may lessen impact stresses on the flooring to lengthen the life of the flooring and make the flooring appear to be more durable and of a higher quality.

SUMMARY

An example of a floor underlayment according to the present disclosure includes a fiber pad and a vapor barrier layer. The fiber pad includes reinforcement fibers and thermoplastic binder fibers binding the reinforcement fibers together. The vapor barrier layer has a bottom surface attached to the fiber pad, a top surface opposite of the bottom surface, and a matrix of holes extending through the top and bottom surfaces thereof. The holes are configured to allow moisture to flow through the holes in a downward direction from the top surface of the vapor barrier layer to the bottom surface of the vapor barrier layer while inhibiting water flow through the holes in an upward direction opposite of the downward direction.

In one aspect, the holes in the vapor barrier layer are spaced apart from one another by a first distance along a length of the fiber pad, the holes in the vapor barrier layer are spaced apart from one another by a second distance along a width of the fiber pad, and each of the first and second distances are within a range from 0.5 inch to 1.5 inches.

In one aspect, the second distance is different than the first distance.

In one aspect, the first and second distances are equal to one another.

In one aspect, each of the holes has a diameter within a range from 1 millimeter (mm) to 2 mm.

In one aspect, the holes have straight sides such that a first diameter of each of the holes at the top surface of the vapor barrier layer is equal to a second diameter of the respective hole at the bottom surface of the vapor barrier layer.

In one aspect, the holes have sides that are tapered inward in the downward direction such that a first diameter of each of the holes at the top surface of the vapor barrier layer is greater than a second diameter of the respective hole at the bottom surface of the vapor barrier layer.

In one aspect, the fiber pad is free of a matrix of holes extending through top and bottom surfaces thereof.

In one aspect, the fiber pad has a top surface, a bottom surface, and a matrix of holes extending through the top and bottom surfaces of the fiber pad.

In one aspect, each of the holes in the fiber pad is aligned with one of the holes in the vapor barrier layer in a first direction along a length of the floor underlayment and in a second direction along a width of the floor underlayment.

In one aspect, the fiber pad has a first thickness and the vapor barrier layer has a second thickness that is less than the first thickness.

In one aspect, the first thickness is within a range from 1.5 mm to 4.75 mm, and the second thickness is within a range from 1 mil to 3 mils.

In one aspect, the fiber pad is made from a hygroscopic material.

In one aspect, the reinforcement fibers include at least one of polyester fibers, nylon fibers, acrylic fibers, cotton fibers, polypropylene fibers, denim fibers, paper fibers, cardboard fibers, and hemp fibers.

In one aspect, the vapor barrier layer is made from plastic.

In one aspect, the vapor barrier layer is bonded to the fiber pad using adhesive.

Another example of a floor underlayment according to the present disclosure includes a hygroscopic fiber pad and a plastic vapor barrier layer bonded to the fiber pad using adhesive. The fiber pad includes reinforcement fibers and thermoplastic binder fibers binding the reinforcement fibers together, the fiber pad having a thickness within a range from 1.5 mm to 4.75 mm. The vapor barrier layer has a thickness within a range from 1 mil to 3 mils. The floor underlayment has a matrix of holes that extend completely through the vapor barrier layer without extending into or through the fiber pad. Each of the holes has a diameter within a range from 1 mm to 2 mm. Each of the holes has straight sides such that a first diameter thereof at a top surface of the vapor barrier layer is equal to a second diameter thereof at a bottom surface of the vapor barrier layer.

In one aspect, the holes in the vapor barrier layer are spaced apart from one another by a first distance along a length of the fiber pad, the holes in the vapor barrier layer are spaced apart from one another by a second distance along a width of the fiber pad, and each of the first and second distances are within a range from 0.5 inch to 1.5 inches.

An example of a floor structure according to the present disclosure includes a subfloor, a floor surface layer, and a floor underlayment disposed between the subfloor and the floor surface layer. The floor underlayment includes a fiber pad and a vapor barrier layer. The fiber pad includes reinforcement fibers and thermoplastic binder fibers binding the reinforcement fibers together. The vapor barrier layer has a bottom surface attached to the fiber pad, a top surface opposite of the bottom surface, and a matrix of holes extending through the top and bottom surfaces thereof. The holes are configured to allow moisture to flow through the holes in a downward direction from an interface between the floor surface layer and the floor underlayment to the fiber pad while inhibiting water flow through the holes in an upward direction opposite of the downward direction.

In one aspect, the fiber pad is made from a hygroscopic material, the fiber pad has a thickness within a range from 1.5 mm to 4.75 mm, the vapor barrier layer is made from plastic, the vapor barrier layer is bonded to the fiber pad using adhesive, the vapor barrier layer has a thickness within a range from 1 mil to 3 mils, each of the holes has a diameter within a range from 1 mm to 2 mm, and each of the holes has straight sides such that a first diameter thereof at the top surface of the vapor barrier layer is equal to a second diameter thereof at the bottom surface of the vapor barrier layer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
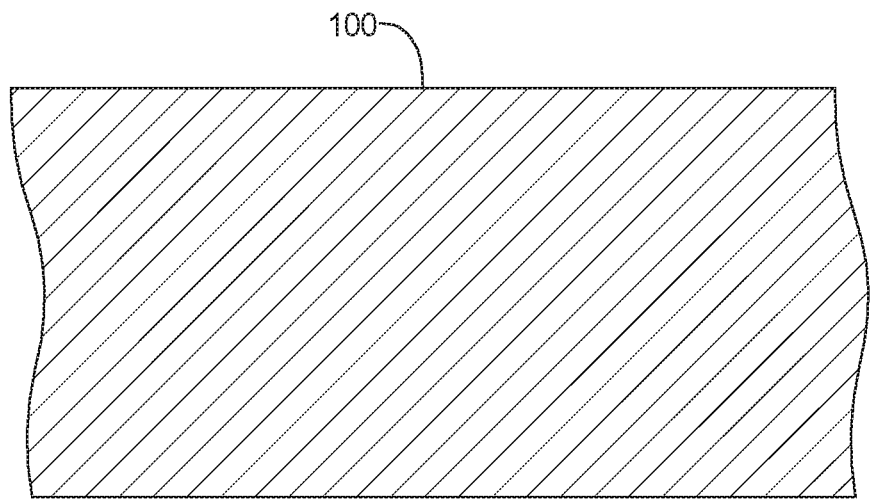
FIG. 1 is a side or cross-sectional view of a portion of a fiber batt.

FIG. 1 shows a side or cross-sectional view of an insulative fiber batt 100, according to the present disclosure. The insulative fiber batt 100 is manufactured from any of a wide variety of reinforcement fiber compositions including, for example, polyester, nylon, acrylic, cotton, polypropylene, denim, cellulose fibers (paper, cardboard, hemp, etc.), or combinations thereof, including both natural and man-made fibers. Randomly distributed reinforcement fibers and thermoplastic binder fibers having lengths between 1/16 inch to 1.5 inches and a denier of between 5 and 12 are used to form the fiber batt 100, which is processed to form an insulative floor pad 90 (FIG. 2).

Figure 2:
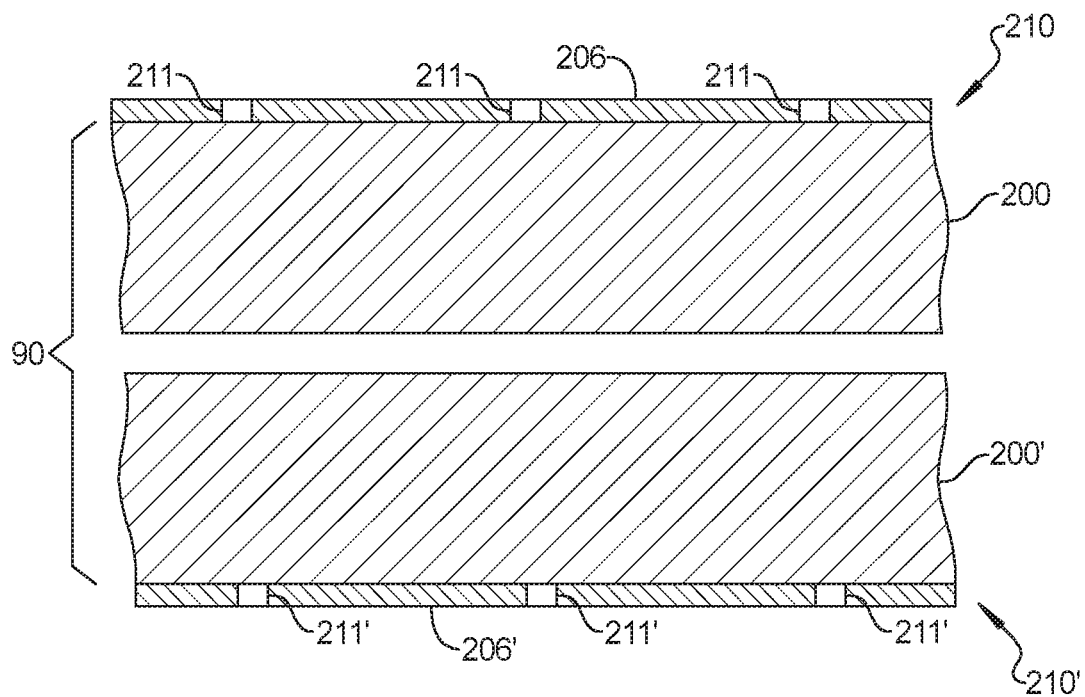
FIG. 2 is two fiber batts bonded to vapor barriers to form two floor underlayment pads according to the present disclosure.

FIG. 2 shows one embodiment of the present disclosure where two fiber pads 200' and 200 are bonded to vapor barrier layers 206' and 206 to form two floor underlayment pads 210' and 210. The resulting pads 210, 210' may be used as an underlayment for laminate flooring, floating engineered wood, other types of flooring or for other purposes. The fiber batt 100 is first heated in an oven 110 and compressed to form the insulative floor pad 90. Optionally, the insulative floor pad 90 can be split into two partial thickness pads 200' and 200, and each pad 200', 200 can be bonded to one of the vapor barrier layer 206' and 206 to form the underlayment pads 210' and 210. The vapor barrier layer 206' and 206 have a matrix of holes 211' and 211, respectively, which allow moisture to drain from the interface between (i) the underlayment pads 210' and 210 and (ii) flooring underneath which the pads 210' and 210 are placed.

Each partial thickness pad 200' and 200 may be of equal thickness (i.e., the insulative floor pad 90 is split in half), or may be of unequal thicknesses. A system and method according to the present disclosure is capable of forming a partial thickness batt of about 1/16 of an inch or greater. The starting insulative floor pad 90 may be split longitudinally to provide two, three or more partial thickness batts.

The thermoplastic binder fibers and reinforcement fibers are laid randomly yet consistently in x-y-z axes. The reinforcement fibers are generally bound together by heating the binder fibers above their glass transition temperature. Typically, less than about 20% by weight binder fiber is used, and preferably about 15% binder fiber is used to form the insulative floor pad 90.

Thermoplastic binder fibers are provided having a weight of less than 0.2 pounds per square foot and, more particularly, preferably about 0.1875 pounds per square foot. The remaining reinforcement fiber is greater than 0.8 pounds per square foot, and preferably 1.0625 pounds per square foot. The binder fibers are preferably a mixture of thermoplastic polymers which consist of polyethylene/polyester or polypropylene/polyester or combinations thereof.

The insulative floor pad 90 is formed by heating the fiber batt 100 in the oven 110 to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves. Although the insulative floor pad 90 is described as being formed using a thermally bound process that involves heating thermoplastic binder fibers to melt the binder fibers and thereby hold the reinforcement fibers together, the insulative floor pad 90 may be produced using other manufacturing processes and/or materials. For example, the insulative floor pad 90 may be formed using a needle punch or a spun-bound process.

The insulative fiber batt 100 is compressed to form the insulative floor pad 90 so it has a density of greater than about 10 pounds per cubic foot. For underlayment floor systems, the insulative floor pad 90 preferably has a density of greater than about 10 pounds per cubic foot and, more preferably, about 13.3 pounds per cubic foot with a thickness of about 1/8 inch. The insulative floor pad 90 may be treated with a fungistat to prevent mold growth.

The sound insulating properties of the material as tested under ASTME90-97, ASTME413-87 provide that the insulative floor pad 90 preferably has a compression resistance at 25% of the original thickness of greater than about 20 pounds per square inch (psi) and preferably about 23.2 psi, at 30% of greater than about 35.0 psi and preferably about 37.0 psi, and at 50% of greater than about 180 psi and preferably about 219 psi. The compression set at a compression of 25% of the original thickness is less than 20% and preferably about 18.8%, and the tensile strength is between about 60 and 80 pounds and, most preferably, about 78.4 pounds.

Figure 3:
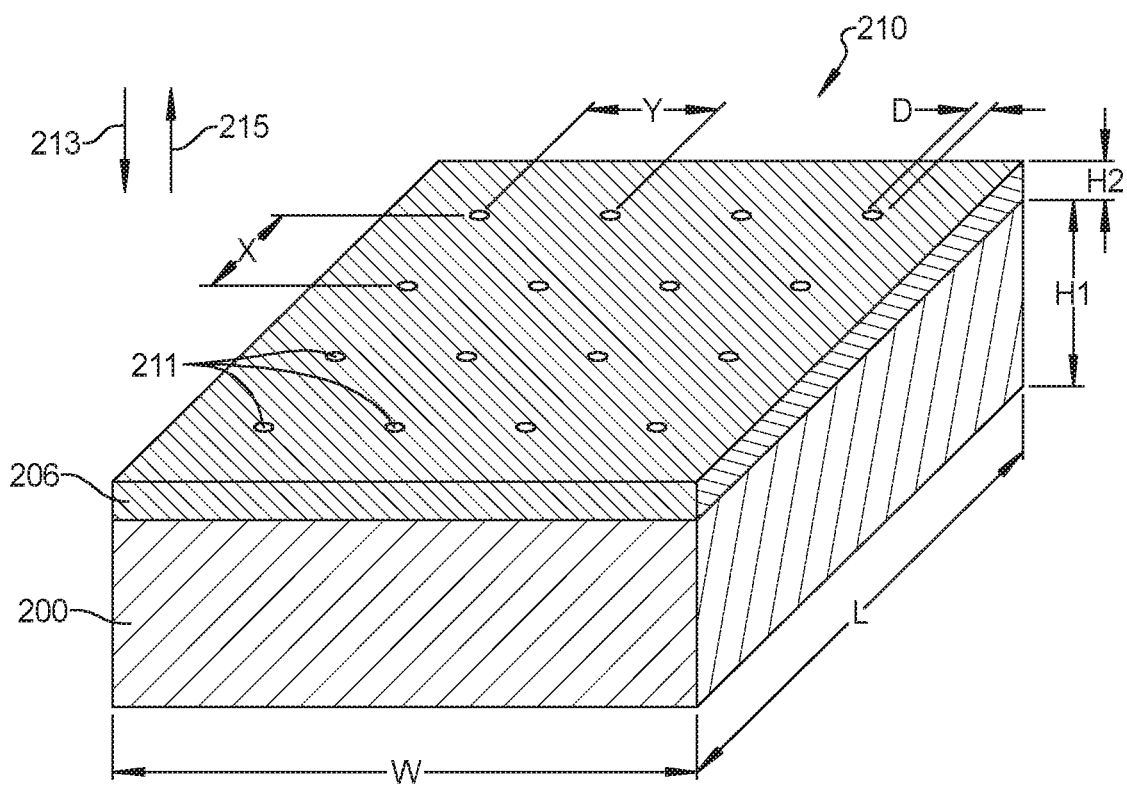
FIG. 3 is a perspective view of a portion of one of the floor underlayment pads of FIG. 2.

As shown in FIG. 3, the fiber pad 200 has a length L, a width W, and a thickness or height H1, and the vapor barrier layer 206 has the same length L, the same width W, and a thickness or height H2. The height H2 of the vapor barrier layer 206 may be different than the height H1 of the fiber pad 200. In one example, the height H1 of the fiber pad 200 is within a range from 1.5 millimeters (mm) to 4.75 mm, and the height H2 of the vapor barrier layer 206 is within a range from 1 mil to 3 mils. In one example, the height H2 of the vapor barrier layer 206 is 1.5 mils.

The holes 211 in the vapor barrier layer 206 are configured (e.g., spaced apart, sized) to allow water to flow therethrough in a downward direction 213 while inhibiting water flow through the holes 211 in an upward direction 215 opposite of the downward direction 213. The holes 211 in the vapor barrier layer 206 are spaced apart by a distance X along the length L of the vapor barrier layer 206, and the holes 211 are spaced apart by a distance Y along the width W of the vapor barrier layer 206. The distances X and Y between the holes 211 may be equal to one another or different from one another. Each of the distances X and Y between the holes 211 may be a distance within a range from 0.5 inch to 1.5 inches (e.g., 1 inch).

Figure 4:
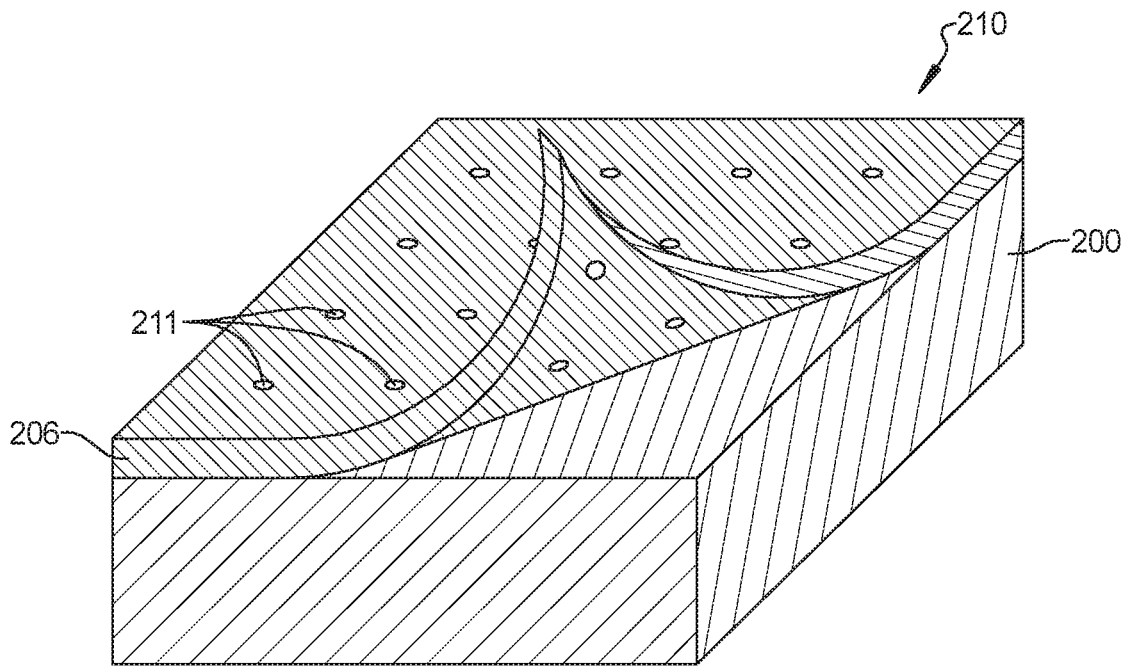
FIG. 4 is a perspective view of one of the floor underlayment pads of FIG. 2 with a corner of the vapor barrier peeled away from the fiber pad.

Each of the holes 211 in the vapor barrier layer 206 has a diameter D. The diameter D of each hole 211 may be within a range from 1 mm to 2 mm. The holes 211 may be formed in the vapor barrier layer 206 using a punch, a needle, and/or a laser. As best shown in FIG. 4, the holes 211 extend completely through the vapor barrier layer 206 but do not extend into or through the fiber pad 200. The fiber pad 200 is hygroscopic. Thus, after water flows through the holes 211 in the downward direction 213, the fiber pad 200 pulls water away from the holes 211 and thereby inhibits or prevents the water from flowing back through the holes 211 in the upward direction 215. The force of gravity also urges water flow through the holes in the downward direction 213 while inhibiting water flow through the holes 211 in the upward direction 215.

Figure 5:
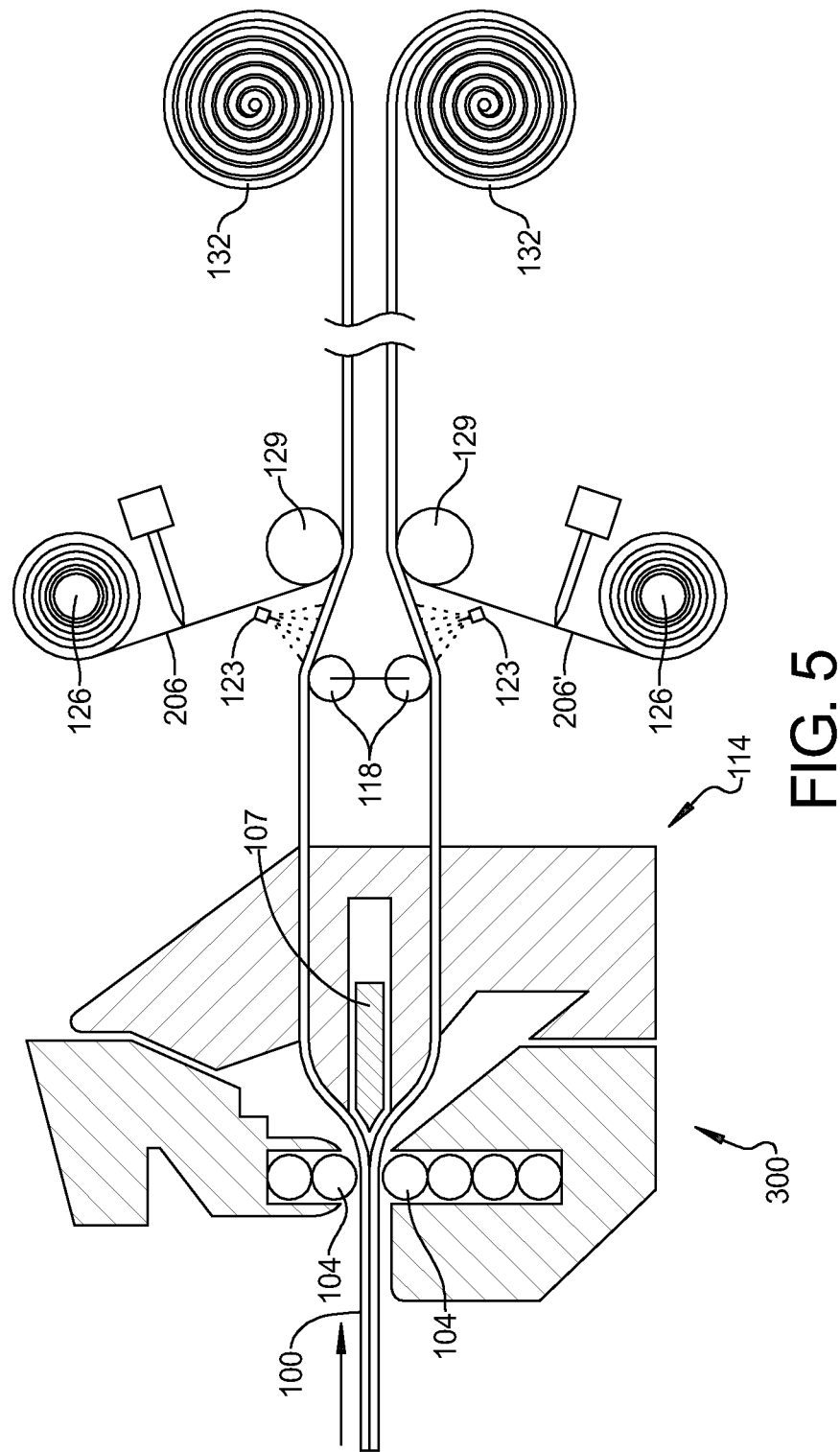
FIG. 5 is a section view of an apparatus for forming two floor underlayment pads from a fiber batt and a roller of vapor barrier material.

FIG. 5 shows an apparatus 300 for forming two floor underlayment pads 210 and 210' from the insulative floor pad 90 using a splitting process. The apparatus includes a splitting machine 114, a pair of tension rollers 118, adhesive appliers 123, a pair of vapor barrier supply rollers 126 providing the vapor barrier layers 206' and 206, a pair of pressure rollers 129, and a pair of take-up rollers 132. As noted above, splitting the insulative floor pad 90 is optional, and therefore the apparatus 300 is only an example of a manufacturing device that may be used to form the pads 200' and 200.

Feed rollers 104 receive the insulative floor pad 90 and pass it to the splitting knife 107, where the insulative floor pad 90 is split into the two partial thickness batts or pads 200' and 200. The thickness of each partial thickness pad is determined by both the thickness of the insulative floor pad 90 and the position of the splitting knife 107 in relation to the feed rollers 104. When the splitting knife 107 is substantially centered between the feed rollers 104, the insulative floor pad 90 will be split into two substantially equal partial thickness pads.

In the present disclosure, it has been found that the insulative floor pad 90 may be controllably and accurately split if the feed rollers 104 are positioned within a predetermined distance from the splitting knife 107. The distance is important because of the compressible and pliable nature of the insulative floor pad 90. In the preferred embodiment, the predetermined distance is from about zero to about two millimeters.

In one example, the splitting machine 114 is a Mercier Turner splitting machine. The splitting machine 114 may be modified by adjusting the feed rollers 104 to a position as close as possible to the splitting knife 107, and removing feed guides so that the splitting knife 107 may be moved closer to the feed rollers 104 than would be possible with the feed guides still in place. In addition, the splitting machine 114 may be modified by changing the feed rollers 104 from a serrated surface type with multiple sections to a smooth surface type of a single piece construction.

The tension rollers 118 maintain a predetermined amount of tension on the two partial thickness pads 200' and 200. The adhesive appliers 123 are downstream of the tension rollers 118 and apply adhesive to outer surfaces of the two partial thickness batts 200, 200' to attach the vapor barrier layers 206, 206' to the batts 200, 200'. In one example, the adhesive appliers 123 spray a layer of adhesive onto the two partial thickness batts 200, 200'. In another example, the adhesive appliers 123 may apply the adhesive directly such as, for example, with wipers or brushes.

The adhesive may be a high viscosity, low melting point adhesive that is applied hot and forms a bond as it cools (i.e., a "hot melt" adhesive). Such adhesives are available from H.B. Fuller, from Swift Adhesive, and from Western Adhesive (the Western Adhesive product is sold under the product name of RHM542.) Alternatively, any other adhesive capable of bonding the fiber batt to the vapor barrier may be used. In one example, the adhesive appliers 123 are omitted or replaced with a heater, and the vapor barrier layers 206, 206' include heat-activated adhesive that adheres the vapor barrier layers 206, 206' to the pads 200, 200' when heated.

The pair of vapor barrier supply rollers 126 are also located downstream of the tension rollers 118 and serve to supply the vapor barrier layer 206' and 206 to each of the two partial thickness pads 200' and 200. The vapor barrier preferably is a plastic sheet material, typically about 1 mil to 3 mils in thickness. The vapor barrier, as the name implies, prevents the travel of vapor (usually water vapor) through the floor underlayment pads 210' or 210. In the preferred embodiment, the vapor barrier layers 206' and 206 are coextruded polyethylene, but alternatively any flexible vapor barrier of a suitable thickness may be used.

The pair of pressure rollers 129 is downstream of the adhesive appliers 123 and the vapor barrier supply rollers 126. The pair of pressure rollers 129 bring together the two partial thickness pads 200' and 200 and the two vapor barrier layers 206' and 206 to form the two floor underlayment pads 210' and 210. The pair of pressure rollers 129 heat and partially compress the batts during the bonding of the adhesive to form the two floor underlayment pads 210' and 210.

In one example, the pressure rollers 129 apply about 400 psi of pressure to the two partial thickness fiber pads 200' and 200 and to the vapor barrier layers 206' and 206. In addition, the pressure rollers 129 are maintained at a temperature of about 200 degrees Fahrenheit. The heating partially softens or breaks down the vapor barrier to make it pliable and to aid in penetration of the vapor barrier by the adhesive.

Downstream of the pressure rollers 129 is a pair of take-up rollers 132. The pair of take-up rollers 132 may be used to roll up the finished floor underlayment pads 210' and 210. The finished floor underlayment pads 210' and 210 may be used as a flooring underlayment, such as a floating engineered wood underlayment or a laminate floor underlayment, or as part of a paint drop cloth, etc.

Figure 6:
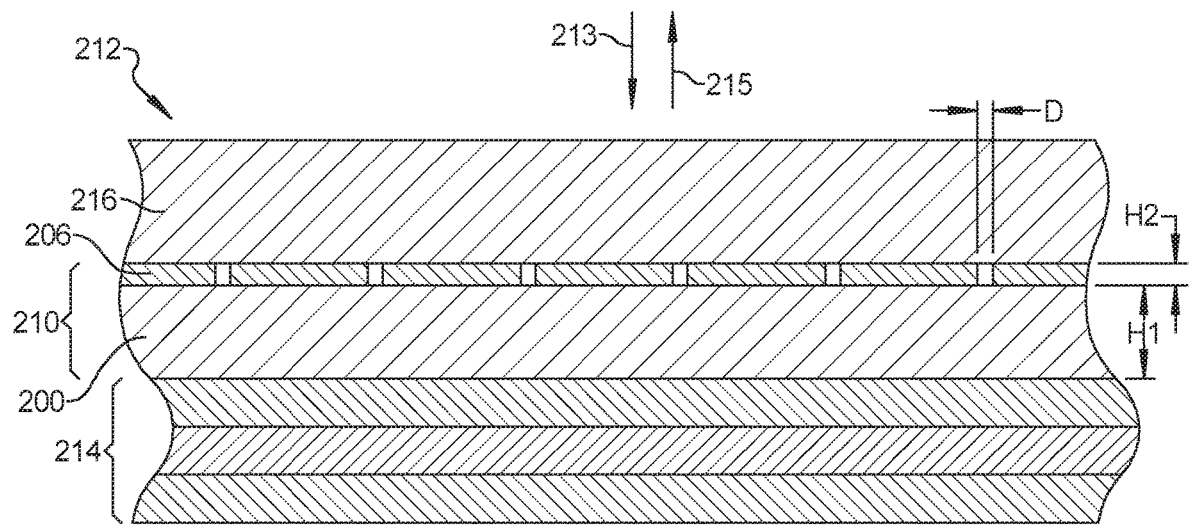
FIG. 6 is a section view of a flooring structure including one of the floor underlayment pads of FIG. 2.

FIG. 6 discloses a floor structure 212 according to the present disclosure. The floor is formed of a subfloor 214, a floor surface layer 216, and the floor underlayment pad 210, which is disposed between the subfloor 214 and the floor surface layer 216. The subfloor 214 may be a concrete subfloor or a wood subfloor. The floor surface layer 216 can be laminate flooring, engineered wood flooring, or another type of flooring.

The floor underlayment pad 210 is formed by the binder and reinforcement fibers, which are distributed substantially random in a plane. The binder fibers are meltable at a predetermined temperature to couple the binding fibers to the reinforcement fibers. The binder fibers are thermoplastic and are preferably selected from the group containing polyethylene, polyester, polypropylene, and mixtures thereof. The floor underlayment pad 210 may be treated with a fungistat to prevent mold growth.

During use, moisture tends to accumulate in the interface between the floor surface layer 216 and the floor underlayment pad 210, which may damage the floor surface layer 216. To prevent this, the holes 211 are placed in the vapor barrier layer 206 of the floor underlayment pad 210. The size of the holes 211 and the spacing between the holes 211 allow moisture to flow through the holes 211 in the downward direction 213 while inhibiting moisture flow through the holes 211 in the upward direction 215. In addition, the fiber pad 200 is made from hygroscopic materials such that the fiber pad 200 pulls moisture away from the holes 211 and thereby inhibits or prevents the moisture from flowing back through the holes 211 in the upward direction 215. If the fiber pad 200 were made from materials such as rubber, closed-cell foam, or cross-linked polyethylene, the fiber pad 200 likely would not be hygroscopic and therefore would not perform as described above. The force of gravity also urges moisture flow through the holes in the downward direction 213 while inhibiting moisture flow through the holes 211 in the upward direction 215. After moisture flows in the downward direction 213 through the holes 211, the fiber pad 200 absorbs the moisture. The moisture then evaporates through the subfloor 214 and/or through the perimeter edges of the fiber pad 200.

Figure 7:
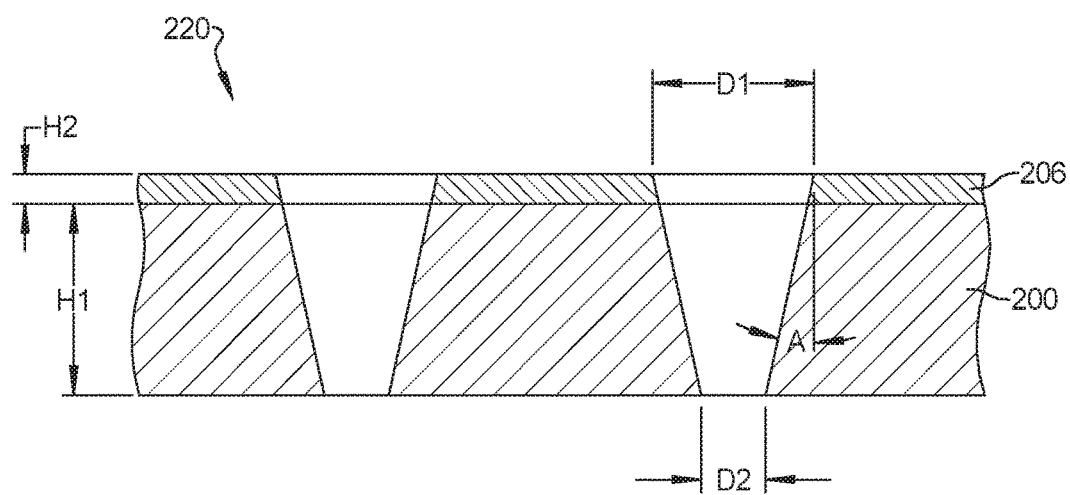
FIG. 7 is a section view of another floor underlayment pad according to the present disclosure.

FIG. 7 shows a floor underlayment pad 220 that is similar to the floor underlayment pad 210 except that the holes 211 extend through both the vapor barrier layer 206 and the fiber pad 200. In addition, in the floor underlayment pad 210, the holes 211 have straight sides as shown in FIG. 2, while in the floor underlayment pad 220, the holes 211 have sides that are tapered inward in the downward direction 213. Thus, the holes 211 have a funnel shape, which further urges water flow through the holes in the downward direction 213 while inhibiting water flow through the holes 211 in the upward direction 215. In various implementations, the holes 211 may taper inward in the downward direction 213, but may extend only through the vapor barrier layer 206 (i.e., the holes 211 may not extend through the fiber pad 200). In other implementations, the holes 211 may extend through both the vapor barrier layer 206 and the fiber pad 200, but the holes 211 may have straight sides (i.e., the holes 211 may not taper inward in the downward direction 213).

In the example shown in FIG. 7, the holes 211 in the floor underlayment pad 220 have a taper angle A. In addition, the holes 211 have a diameter D1 at the top surface of the vapor barrier layer 206, and a diameter D2 at the bottom surface of the fiber pad 200. In one example, the diameter D1 of the hole 211 is 2 mm, the diameter D2 of the hole 211 is 1 mm, the height H1 of the fiber pad 200 is 3.125 mm, the height H2 of the vapor barrier layer 206 is 2 mils, and the taper angle A of the hole 211 is 8.947 degrees.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A floor underlayment comprising:
   a fiber pad including reinforcement fibers and thermoplastic binder fibers binding the reinforcement fibers together; and
   a vapor barrier layer having a bottom surface attached to the fiber pad, a top surface opposite of the bottom surface, and a matrix of holes extending through the top and bottom surfaces thereof, wherein the holes are configured to allow moisture to flow through the holes in a downward direction from the top surface of the vapor barrier layer to the bottom surface of the vapor barrier layer while inhibiting water flow through the holes in an upward direction opposite of the downward direction.

2. The floor underlayment of claim 1 wherein:
   the holes in the vapor barrier layer are spaced apart from one another by a first distance along a length of the fiber pad;
   the holes in the vapor barrier layer are spaced apart from one another by a second distance along a width of the fiber pad; and
   each of the first and second distances are within a range from 0.5 inch to 1.5 inches.

3. The floor underlayment of claim 2 wherein the second distance is different than the first distance.

4. The floor underlayment of claim 2 wherein the first and second distances are equal to one another.

5. The floor underlayment of claim 1 wherein each of the holes has a diameter within a range from 1 millimeter (mm) to 2 mm.

6. The floor underlayment of claim 1 wherein the holes have straight sides such that a first diameter of each of the holes at the top surface of the vapor barrier layer is equal to a second diameter of the respective hole at the bottom surface of the vapor barrier layer.

7. The floor underlayment of claim 1 wherein the holes have sides that are tapered inward in the downward direction such that a first diameter of each of the holes at the top surface of the vapor barrier layer is greater than a second diameter of the respective hole at the bottom surface of the vapor barrier layer.

8. The floor underlayment of claim 1 wherein the fiber pad is free of a matrix of holes extending through top and bottom surfaces thereof.

9. The floor underlayment of claim 1 wherein the fiber pad has a top surface, a bottom surface, and a matrix of holes extending through the top and bottom surfaces of the fiber pad.

10. The floor underlayment of claim 9 wherein each of the holes in the fiber pad is aligned with one of the holes in the vapor barrier layer in a first direction along a length of the floor underlayment and in a second direction along a width of the floor underlayment.

11. The floor underlayment of claim 1 wherein the fiber pad has a first thickness and the vapor barrier layer has a second thickness that is less than the first thickness.

12. The floor underlayment of claim 11 wherein the first thickness is within a range from 1.5 mm to 4.75 mm, and the second thickness is within a range from 1 mil to 3 mils.

13. The floor underlayment of claim 1 wherein the fiber pad is made from a hygroscopic material.

14. The floor underlayment of claim 1 wherein the reinforcement fibers include at least one of polyester fibers, nylon fibers, acrylic fibers, cotton fibers, polypropylene fibers, denim fibers, paper fibers, cardboard fibers, and hemp fibers.

15. The floor underlayment of claim 1 wherein the vapor barrier layer is made from plastic.

16. The floor underlayment of claim 1 wherein the vapor barrier layer is bonded to the fiber pad using adhesive.

17. A floor underlayment comprising:
a hygroscopic fiber pad including reinforcement fibers and thermoplastic binder fibers binding the reinforcement fibers together, the fiber pad having a thickness within a range from 1.5 millimeters (mm) to 4.75 mm; and
a plastic vapor barrier layer bonded to the fiber pad using adhesive, the vapor barrier layer having a thickness within a range from 1 mil to 3 mils, the floor underlayment having a matrix of holes that extend completely through the vapor barrier layer without extending into or through the fiber pad, each of the holes having a diameter within a range from 1 mm to 2 mm, each of the holes having straight sides such that a first diameter thereof at a top surface of the vapor barrier layer is equal to a second diameter thereof at a bottom surface of the vapor barrier layer.

18. The floor underlayment of claim 17 wherein:
the holes in the vapor barrier layer are spaced apart from one another by a first distance along a length of the fiber pad;
the holes in the vapor barrier layer are spaced apart from one another by a second distance along a width of the fiber pad; and
each of the first and second distances are within a range from 0.5 inch to 1.5 inches.

19. A floor structure comprising:
a subfloor;
a floor surface layer; and
a floor underlayment disposed between the subfloor and the floor surface layer, the floor underlayment including a fiber pad and a vapor barrier layer, the fiber pad including reinforcement fibers and thermoplastic binder fibers binding the reinforcement fibers together, the vapor barrier layer having a bottom surface attached to the fiber pad, a top surface opposite of the bottom surface, and a matrix of holes extending through the top and bottom surfaces thereof, wherein the holes are configured to allow moisture to flow through the holes in a downward direction from an interface between the floor surface layer and the floor underlayment to the fiber pad while inhibiting water flow through the holes in an upward direction opposite of the downward direction.

20. The floor structure of claim 19 wherein:
the fiber pad is made from a hygroscopic material;
the fiber pad has a thickness within a range from 1.5 millimeters (mm) to 4.75 mm;
the vapor barrier layer is made from plastic;
the vapor barrier layer is bonded to the fiber pad using adhesive;
the vapor barrier layer has a thickness within a range from 1 mil to 3 mils;
each of the holes has a diameter within a range from 1 mm to 2 mm; and
each of the holes has straight sides such that a first diameter thereof at the top surface of the vapor barrier layer is equal to a second diameter thereof at the bottom surface of the vapor barrier layer.

* * * * *